United States Patent Office 2,753,361
Patented July 3, 1956

2,753,361

17-THIO-5-ANDROSTENE-3-OLS

Raymond M. Dodson, Park Ridge, and Paul B. Sollman, Skokie, Ill., assignors, by mesne assignments, to G. D. Searle & Co., Skokie, Ill., a corporation of Delaware No Drawing. Application February 1, 1955,
Serial No. 485,606

8 Claims. (Cl. 260—397.5)

The present invention relates to a new class of thio-steroids, and is specifically concerned with those derivatives of 5-androsten-3-ol which are substituted at the 17-position by a substituent containing sulfur in a bivalent state, said substituent being attached to the carbon atom at position 17 by a carbon-sulfur valence bond. Accordingly, the thio-substituted androstene derivatives which comprise this invention can be represented by the structural formula

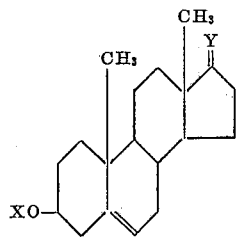

wherein X is hydrogen or a lower alkanoyl radical and Y is a member of the group consisting of

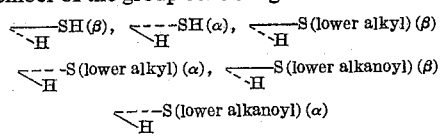

and =S. The term lower alkanoyl is defined herein as an acyl radical derived from a lower alkanoic acid. The lower alkanoyl radicals embraced in this definition include formyl, acetyl, propionyl, butyryl, valeryl, caproyl, and branched-chained isomers thereof.

It has been discovered that the 17-thiols, 17-thioethers, 17-thioketones, and 17-acylthio derivatives which constitute this invention can be prepared from readily available and relatively abundant starting materials such as dehydroisoandrosterone. For example, the steps which comprise reducing dehydroisoandrosterone acetate with sodium borohydride to the 3-monoacetate of 5-androstene-3β,17β-diol, esterification of the 17β-hydroxyl group with p-toluenesulfonyl chloride, and selective hydrolysis at the ester group at position 3 lead to the 17β-p-toluenesulfonate of 5-androstene-3β,17β-diol. The ester grouping in this compound is of the neopentyl type and by analogy with similar compounds, such as the neopentyl halides, would be expected to be resistant to replacement by another negative group. Surprisingly, when the ester is treated with sodium hydrosulfide, replacement of the ester grouping occurs readily, with the introduction of a thiol group in the α-configuration and the formation of 3β-hydroxy-5-androstene-17α-thiol. The corresponding disulfide is obtained as a by-product in this reaction, as disclosed in greater detail in the pertinent example.

Mercaptan derivatives which have the β-configuration of the thiol group are conveniently obtained from dehydroisoandrosterone by another method which has been newly developed. When the dibenzylmercaptole of dehydroisoandrosterone, described in Journal American Chemical Society, 70, 1256 (1948) is treated in liquid ammonia with metallic sodium, the reaction product is the thioketone of the following structure

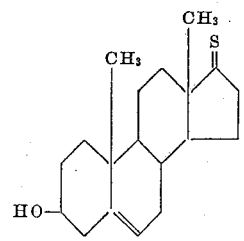

Reduction of this compound with sodium borohydride yields 3β-hydroxy-5-androstene-17β-thiol.

By contacting the mercaptans described herein with lower alkanoic acid anhydrides, conveniently in pyridine solution, thioesters are obtained in which the hydrogen of the thiol group is replaced by the acyl radical derived from a lower alkanoic acid. The compounds obtained thereby are of the type

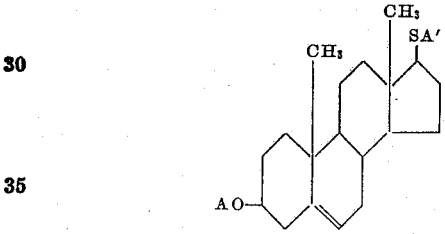

wherein A and A' are acyl radicals derived from lower alkanoic acids. A and A' accordingly represent formyl, acetyl, propionyl, butyryl, valeryl, caproyl, and branched chain isomers of the foregoing. Other important compounds of this invention are the 17-thioethers which have the structural formula

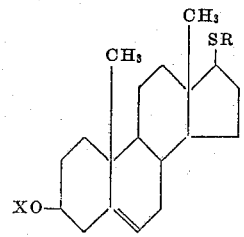

wherein X is hydrogen or a lower alkanoyl radical and R is a lower alkyl radical. R can be selected from methyl, ethyl, and straight or branched-chain propyl, butyl, amyl, and hexyl. One method of preparing these compounds is by alkylation of the corresponding mercaptan. Suitable reaction media for carrying out the alkylation reaction are mixtures of a lower alkyl iodide, a sodium alcoholate, and a lower aliphatic alcohol. Thioethers having a lower alkylthio group in both the α- and β-configuration at position 17 can be prepared by alkylating the corresponding mercaptan of the same configuration. An alternative method for preparing a thioether having the β-configuration is exemplified by the conversion of 17α-methylthio-5-androsten-3β-ol to 17β-methylthio-5-androsten-3β-ol.

This transformation is achieved with the aid of an isomerization process carried out on a sulfone derivative. When 17α-methylthio-5-androsten-3β-ol is oxidized with two molecular equivalents of perbenzoic acid, the product is 17α-methylsulfonyl-5-androsten-3β-ol. Under the influence of potassium tert.-butoxide, this sulfone is isomerized to 17β-methylsulfonyl-5-androsten-3β-ol having the following formula

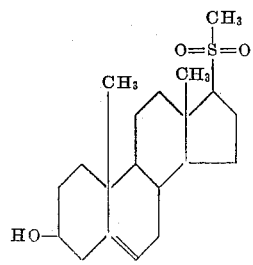

Reduction of this compound with lithium aluminum hydride in an ethereal solvent such as tetrahydrofuran then yields the same 17β-methylthio-5-androsten-3β-ol that is obtained by the direct alkylation of 3β-hydroxy-5-androstene-17β-thiol.

The compounds which constitute this invention are useful in chemotherapeutics. They are effective antagonists of naturally occurring steroid hormones which may be regarded as oxygen analogs. For example the claimed compounds have been found to antagonize the localized effects of testosterone. They also possess one of the specific useful properties of the adrenocortical hormones in that they are effective in the prevention of traumatic shock. Their alleviation of stress states of this type is not accompanied by the wide diversity of side effects observed with the use of such naturally occurring hormones as cortisone and hydrocortisone. The thioethers of this invention form sulfonium salts which have valuable antibacterial properties and are effective against *Bacillus subtilis*. The mercaptans of this invention are useful as analytical reagents. They give characteristic precipitates with heavy metal ions, and the precipitated salts obtained with lead are useful for both the qualitative and quantitative analysis of this element.

This invention will appear more fully from the examples which follow. These examples are set forth by way of illustration only and it will be understood that the invention is not to be construed as limited in spirit or in scope by the details contained therein. It will be apparent to those skilled in the art that many modifications in materials and methods can be made without departing from the scope of this invention. In these examples, temperatures are given in degrees centigrade and quantities of materials in parts by weight.

Example 1

A solution of 25 parts of dehydroisoandrosterone acetate in 850 parts of methanol is cooled in an ice bath to 8° C. and treated by the addition of 12.5 parts of sodium borohydride dissolved in 250 parts of methanol. The mixture is kept in an ice bath for 10 minutes and is then treated with small portions of acetic acid until the evolution of gas is complete. An additional 50 parts of acetic acid and 3000 parts of water is then added and the precipitated product is filtered, washed with water and dried. Recrystallization of this product from aqueous acetone yields the purified 3-monoacetate of 5-androstene-3β,17β-diol, melting at 147–148° C.

Example 2

A solution prepared from 22 parts of the 3-monoacetate of a 5-androstene-3β,17β-diol, 118 parts of anhydrous pyridine and 22 parts of p-toluenesulfonyl chloride is allowed to stand for about 18 hours at 65° C. It is then poured into 1800 parts of ice water, and the precipitate is collected on a filter, washed with water and dried. By recrystallization from aqueous dioxane 3β-acetoxy-17β-p-toluenesulfonoxy-5-androstene is obtained as well-formed crystals melting at 166–168° C. This compound has the structural formula

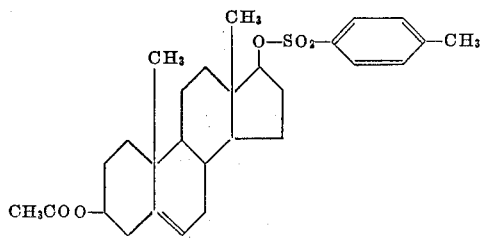

Example 3

A solution prepared from 30 parts of 3β-acetoxy-17β-p-toluenesulfonoxy-5-androstene, 310 parts of dioxane, 95 parts of methanol, and 46 parts of a solution prepared from equal weights of sodium hydroxide and of water is allowed to stand at room temperature for 2 hours. The mixture is then diluted with 600 parts of water and the crystalline precipitate of 17β-p-toluenesulfonoxy-5-androsten-3β-ol is collected on a filter, washed with water, and dried. This product melts at 102–103° C., then solidifies and remelts at 130–132° C. It has the structural formula

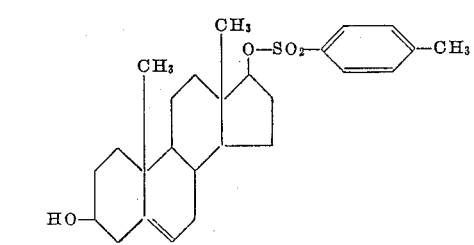

Example 4

A solution of sodium hydrosulfide is prepared by passing a stream of hydrogen sulfide gas through a mixture of 520 parts of ethylene glycol monoethyl ether and 35 parts of sodium methoxide, until substantially all of the sodium methoxide is consumed, as evidenced by the completion of the exothermic reaction. About 1 hour is a convenient period of time for this reaction.

This solution of sodium hydrosulfide is mixed with 14 parts of 17β-p-toluenesulfonoxy-5-androsten-3β-ol and heated under reflux for 5 hours. The mixture is then poured into 2500 parts of water and partitioned with ether. A product insoluble in both the aqueous and organic phases is collected on a filter and washed with water. This product is the disulfide melting at 265–268° C. and having the structural formula

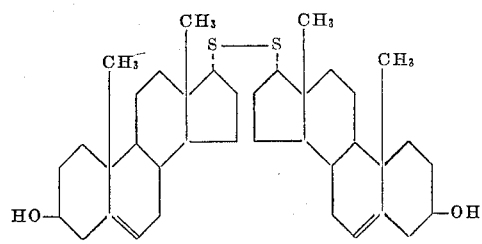

The 3,3'-diacetate of this disulfide, prepared by heating the diol with pyridine and acetic anhydride on a steam bath, crystallizes from the reaction mixture. On being recrystallized from a mixture of benzene and ethyl acetate, it melts at 297–300° C. The ethereal solution resulting from the sodium hydrosulfide reaction is concentrated to a small volume and diluted with methanol. A crystallizate of 3β-hydroxy-5-androstene-17α-thiol separates and is collected on a filter and washed with methanol. This product melts at 142–144° C. It has the structural formula

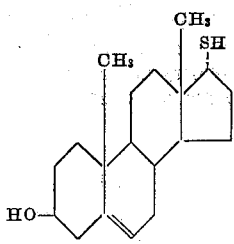

*Example 5*

A mixture of 61 parts of 3β-hydroxy-5-androstene-17α-thiol, 790 parts of anhydrous methanol, 12.3 parts of sodium methoxide and 32 parts of methyl iodide is heated under reflux for a period of 3 hours, after which it is chilled and filtered to remove a small amount of insoluble material. The filtrate is diluted with water, and the crystalline precipitate which forms is collected on a filter. Recrystallization of this material from methanol or from aqueous methanol gives purified 17α-methylthio-5-androsten-3β-ol melting at about 160–161° C. This compound has the structural formula

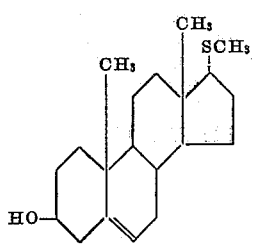

*Example 6*

A mixture of 6 parts of 3β-hydroxy-5-androstene-17α-thiol, 96 parts of anhydrous propyl alcohol, 1.9 parts of sodium propoxide and 3.8 parts of propyl iodide is heated under reflux for a period of 3 hours. The reaction mixture is then poured, with stirring, into several times its volume of water and the precipitated product, 17α-propylthio-5-androsten-3β-ol, is collected on a filter. It is purified by recrystallization from methanol. This compound has the structural formula

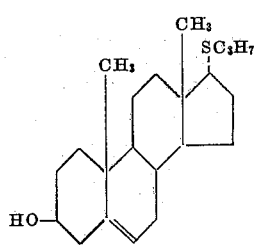

*Example 7*

A solution prepared from 24 parts of 17α-methylthio-5-androsten-3β-ol, 195 parts of butanone, and 205 parts of methyl bromide is placed in a tightly sealed reaction vessel, and allowed to stand for 16 hours at 65° C. The material which crystallizes from the solution is removed by filtration and is recrystallized from water. It is further purified by dissolving it in 1000 parts of hot alcohol and precipitating by the addition of 1000 parts of peroxide-free ether. This compound is the methobromide of 17α-methylthio-5-androsten-3β-ol. It melts with decomposition at 188–189° C. and has the following structural formula

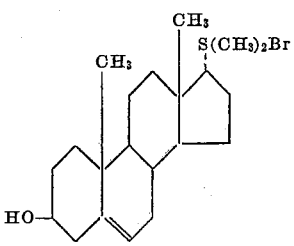

*Example 8*

A suspension of 5.19 parts of the dibenzylmercaptole of dehydroisoandrosterone in 130 parts of liquid ammonia is treated with a total of 5.2 parts of sodium, added in portions at 10 minute intervals over a period of 2 hours. Ammonium chloride (15 parts) and ether (210 parts) are then added and the slurry is stirred for about 16 hours. About 500 parts of water and 15 parts of ammonium chloride are added and the ethereal phase is separated and combined with an ether extract of the aqueous phase. The combined ethereal solution is washed with water and then concentrated to a residual pink oil. A solution of this oil in benzene is poured on a silica gel chromatography column. Elution with benzene yields first a small amount of bibenzyl melting at 45–48° C. Further elution with a 2 volume percent solution of ethyl acetate in benzene affords 3β-hydroxy-5-androstene-17-thione. After recrystallization from a mixture of benzene and petroleum ether, this compound melts at 168–170° C. It has the structural formula

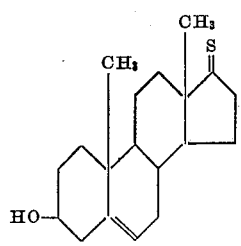

When this compound is dissolved in methanol and treated with a methanolic solution of lead acetate, a bright yellow lead salt precipitates. This precipitate does not begin to form immediately, but only after a delay of at least several seconds, as it is probably a salt of the enethiol which is in tautomeric equilibrium with the thioketone. Formation of the lead salt of this compound affords an alternative means of purification, as the thioketone is regenerated from the salt by such means as dissolving the salt in acetic acid and precipitating the thioketone by dilution with water.

*Example 9*

A solution of 1.34 parts of 3β-hydroxy-5-androstene-17-thione in 52 parts of acetic acid is treated by the addition of 3 parts of concentrated hydrochloric acid. After the mixture has been allowed to stand at room temperature for about 30 minutes, it is diluted with water. The precipitated product is collected and recrystallized from a mixture of benzene and petroleum ether and then from aqueous ethanol, giving dehydroisoandrosterone acetate of melting point 170–171° C.

*Example 10*

A solution prepared from 8 parts of 3β-hydroxy-5-androstene-17-thione, 240 parts of methanol, 1.5 parts of sodium methoxide and 3.8 parts of methyl iodide is allowed to stand for 3 hours at room temperature. The product obtained by diluting the mixture with water is collected on a filter. By several recrystallizations from aqueous methanol there is obtained 17-methylthio-5,16- androstadien-3β-ol melting at 164–166° C. This compound has the structural formula

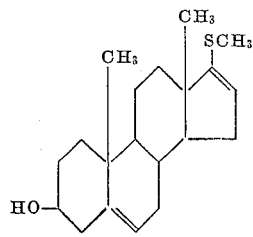

Example 11

A solution of 2 parts of 3β-hydroxy-5-androstene-17-thione in 48 parts of methanol is added to a solution of 4 parts of sodium borohydride in 32 parts of methanol. After 10 minutes at room temperature, the mixture is acidified by the cautious addition of small portions of 10% acetic acid. The precipitate formed by dilution with water is collected on a filter and dried. By recrystallization from a mixture of ether and petroleum ether and then from methanol, there is obtained 3β-hydroxy-5-androstene-17β-thiol melting at 174.5–175.5° C. and having the structural formula

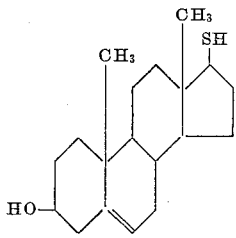

Example 12

A solution of 16 parts of 3β-hydroxy-5-androstene-17β-thiol, 1600 parts of methanol, 3 parts of sodium methoxide, and 7.6 parts of methyl iodide is heated under reflux for 3 hours. The reaction mixture is diluted with water, and the precipitated product is collected on a filter. By recrystallization from aqueous methanol there is obtained purified 17β-methylthio-5-androsten-3β-ol melting at 149–150° C. This compound has the structural formula

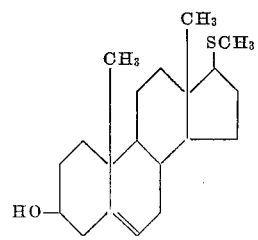

Example 13

A mixture prepared from 10 parts of 3β-hydroxy-5-androstene-17β-thiol, 1000 parts of butanol, 3.3 parts of sodium butoxide and 6.2 parts of butyl iodide is heated under reflux for 3 hours. The reaction mixture is poured, with stirring, into several times its volume of water and the precipitated product is collected on a filter. Purified 17β-butylthio-5-androsten-3β-ol is obtained by recrystallization of this product from methanol. This compound has the structural formula

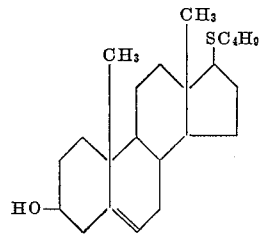

Example 14

A mixture of 5 parts of 3β-hydroxy-5-androstene-17β-thiol, 30 parts of pyridine and 25 parts of valeric anhydride is heated on a steam bath for 2 hours and is then allowed to stand at room temperature for 20 hours. The reaction mixture is poured, with stirring, into 150 parts of water, causing the formation of a precipitate of the valerate of 17β-valerylthio-5-androsten-3β-ol. This divaleryl derivative has the structural formula

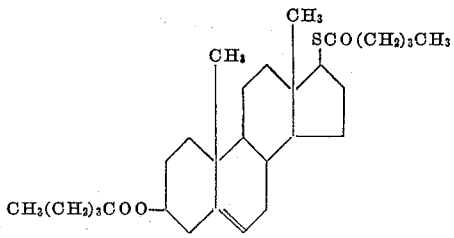

Example 15

A stirred solution of 9.6 parts of 17α-methylthio-5-androsten-3β-ol in 880 parts of benzene is treated over a period of 30 minutes by the gradual addition of a 0.3 molar solution of perbenzoic acid in benzene containing a total of 8.28 parts of perbenzoic acid. After an additional hour the solution is washed with sodium bicarbonate solution and with water and then concentrated to dryness. The residue in benzene solution is reprecipitated by the addition of petroleum ether. This product is then crystallized several times from aqueous alcohol and finally from a mixture of benzene and petroleum ether to give purified 17α-methylsulfonyl-5-androsten-3β-ol melting at 225–227° C. It has the structural formula

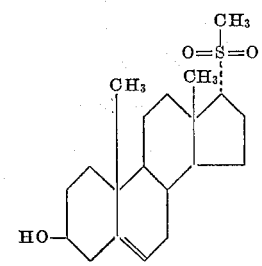

Example 16

Five parts of 17α-methylsulfonyl-5-androsten-3β-ol is dissolved in a solution prepared from 3.6 parts of potassium and 70 parts of tert.-butanol. This reaction mixture is heated under reflux for 17 hours and then concentrated by distillation to about two-thirds of its original volume. The remaining solution is poured into about 300 parts of ice water and this mixture is acidified by the addition of 15 parts of concentrated hydrochloric acid. The precipitated product is collected on a filter, washed with water, dried, and recrystallized from ethyl alcohol or from ethyl acetate. In this manner there is obtained the isomerized sulfone, 17β-methylsulfonyl-5-androsten-3β-ol melting at 242–244° C. This compound has the structural formula

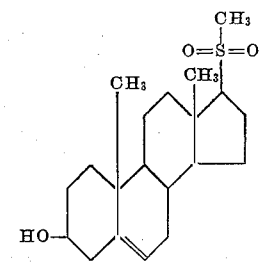

Example 17

A solution of 3.4 parts of 17β-methylsulfonyl-5-androsten-3β-ol, 15 parts of pyridine and 15 parts of acetic anhydride is allowed to stand at room temperature for 16 hours and is then poured, with efficient stirring, into 150 parts of ice water. The precipitated product is collected on a filter, dried, and recrystallized from ethyl acetate to give the acetate of 17β-methylsulfonyl-5-androsten-3β-ol melting at 227–229° C. This compound has the structural formula

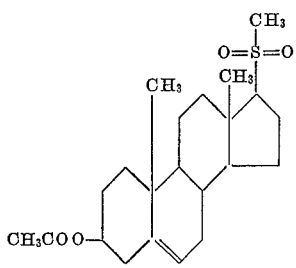

Example 18

A quantity of tetrahydrofuran is purified for this reaction. This is conveniently accomplished by drying it over sodium hydroxide and distilling it successively from sodium and from lithium aluminum hydride. A solution of 2.9 parts of 17β-methylsulfonyl-5-androsten-3β-ol in 27 parts of tetrahydrofuran is added to a solution of 6 parts of lithium aluminum hydride in 90 parts of tetrahydrofuran, and the reaction mixture is heated under reflux for 16 hours. Unreacted lithium aluminum hydride is decomposed by the addition of ethyl acetate. Water (50 parts), 10% sulfuric acid (300 parts), and water (500 parts) are added in succession, with efficient stirring. The suspension is extracted with a total of 700 parts of ether in three portions, and the washed ethereal solution is concentrated to about 5% of its original volume. The solvent mixture remaining at this concentration contains a large percentage of tetrahydrofuran. Water is added, and the crude solid product which precipitates is collected on a filter and washed. This crude product is extracted with a total of 620 parts of benzene in two portions. Some unreacted 17β-methylsulfonyl-5-androsten-3β-ol remains undissolved and is recovered by filtration. The benzene solution is poured on a chromatography column prepared from 105 parts of silica. By elution with a 10 volume per cent solution of ethyl acetate in benzene there is obtained 17β-methylthio-5-androsten-3β-ol. After recrystallization from aqueous methanol this product melts at 150° C. and is identical with the product of Example 12. By elution of the chromatography column with a 30 volume per cent solution of ethyl acetate in benzene, an additional quantity of unreacted 17β-methylsulfonyl-5-androsten-3β-ol is recovered.

Example 19

A solution prepared from 3 parts of 3β-hydroxy-5-androstene-17α-thiol, 15 parts of pyridine and 15 parts of acetic anhydride is allowed to stand at room temperature. During the first hour of reaction time, and especially during the first few minutes, the presence of a free mercaptan in the reaction mixture can be demonstrated by removing a drop of the solution and treating it with one drop of a saturated solution of lead acetate in methanol, whereupon a yellow precipitate of a lead salt of the mercaptan forms. After about an hour, this test becomes very faint. After 16 hours the reaction mixture is poured, with stirring, into 50 parts of water and the crystalline precipitate is collected on a filter. By recrystallization from petroleum ether and then from aqueous ethanol, there is obtained the purified acetate of 17α-acetylthio-5-androstene-3β-ol melting at 152–153° C. This diacetyl derivative has the structural formula

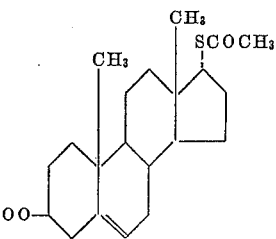

What is claimed is:

1. A compound having the structural formula

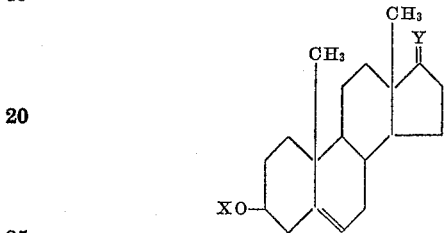

wherein X is a member of the group consisting of hydrogen and lower alkanoyl radicals and Y is a member of the group consisting of

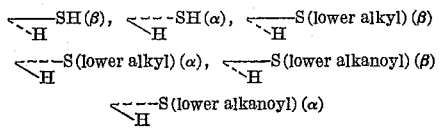

and =S.

2. A compound having the structural formula

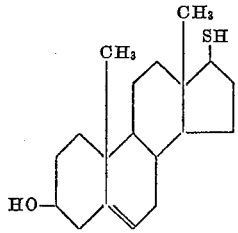

3. 3β-hydroxy-5-androstene-17β-thiol.
4. 3β-hydroxy-5-androstene-17α-thiol.
5. A compound having the structural formula

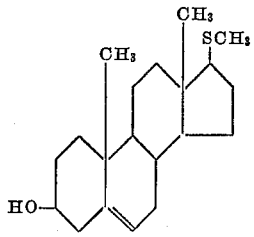

6. 17β-methylthio-5-androsten-3β-ol.
7. 17α-methylthio-5-androsten-3β-ol.
8. 3β-hydroxy-5-androstene-17-thione.

References Cited in the file of this patent
UNITED STATES PATENTS

| | | |
|---|---|---|
| 2,550,702 | Levin | May 1, 1951 |
| 2,598,653 | Wettstein | May 27, 1952 |
| 2,598,654 | Wettstein | May 27, 1952 |
| 2,609,378 | Rosenkranz | Sept. 2, 1952 |
| 2,697,108 | Rosenkranz | Dec. 14, 1954 |